Jan. 29, 1946. J. M. LUCARELLE ET AL 2,393,919
CABLE STRIPPING DEVICE
Filed May 11, 1943 4 Sheets-Sheet 1
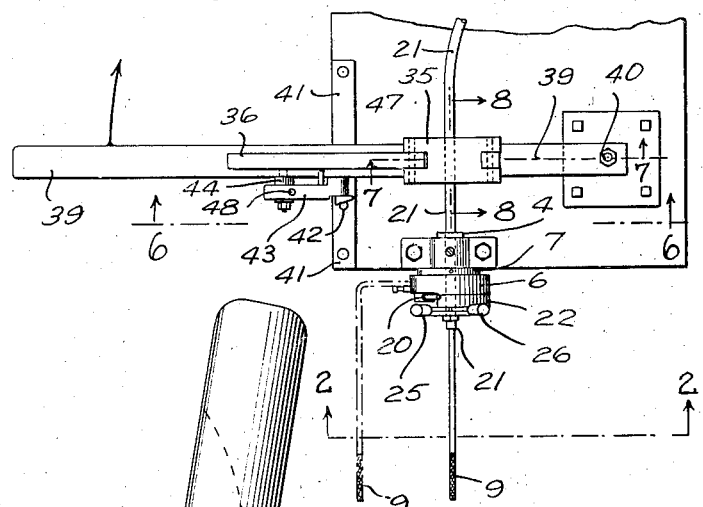
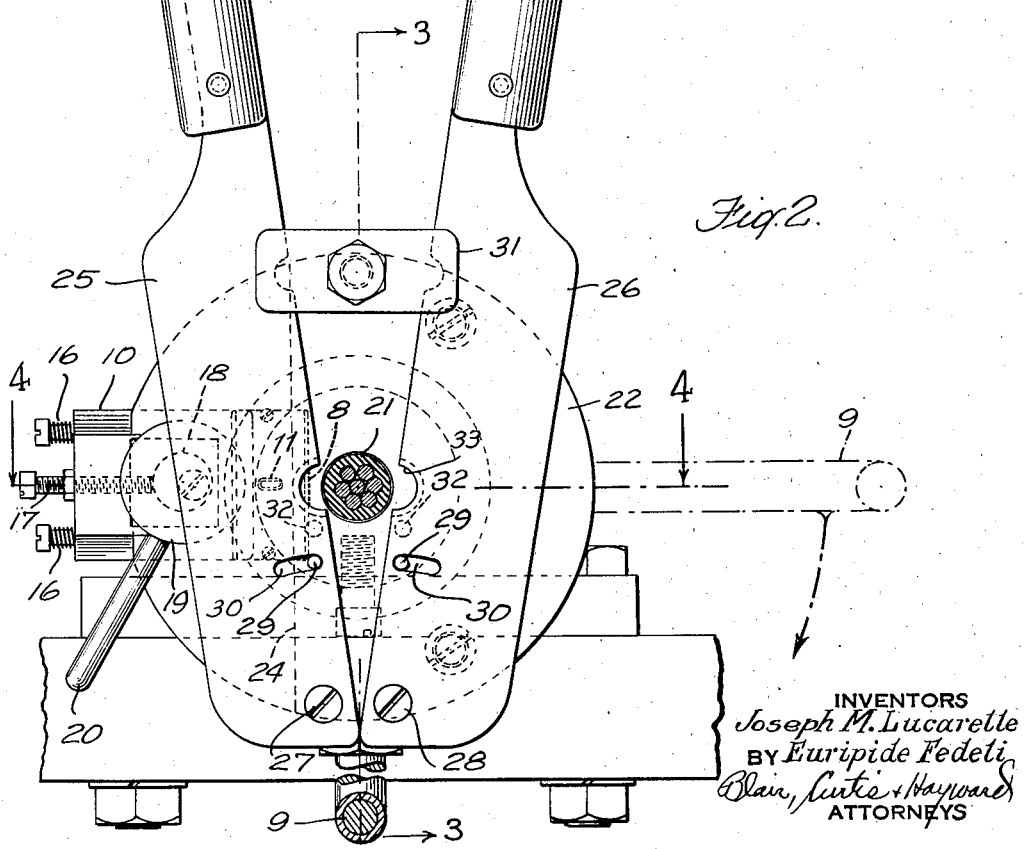
INVENTORS
Joseph M. Lucarelle
BY Euripide Fedeli
Blair, Curtis & Hayward
ATTORNEYS Jan. 29, 1946. J. M. LUCARELLE ET AL 2,393,919
CABLE STRIPPING DEVICE
Filed May 11, 1943 4 Sheets-Sheet 3
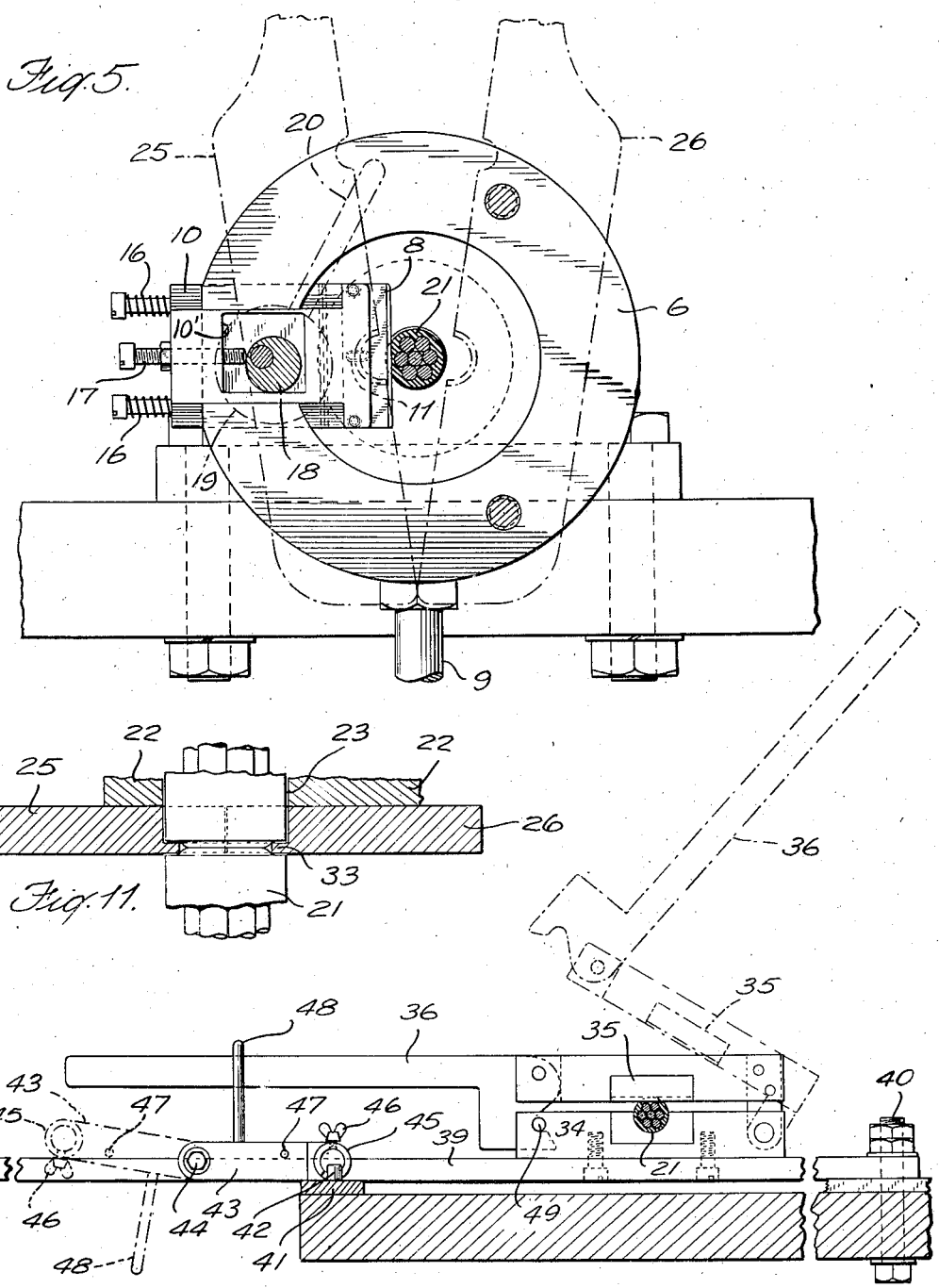
INVENTORS
Joseph M. Lucarelle
BY Euripide Fedeli
Blair, Curtis + Hayward
ATTORNEYS

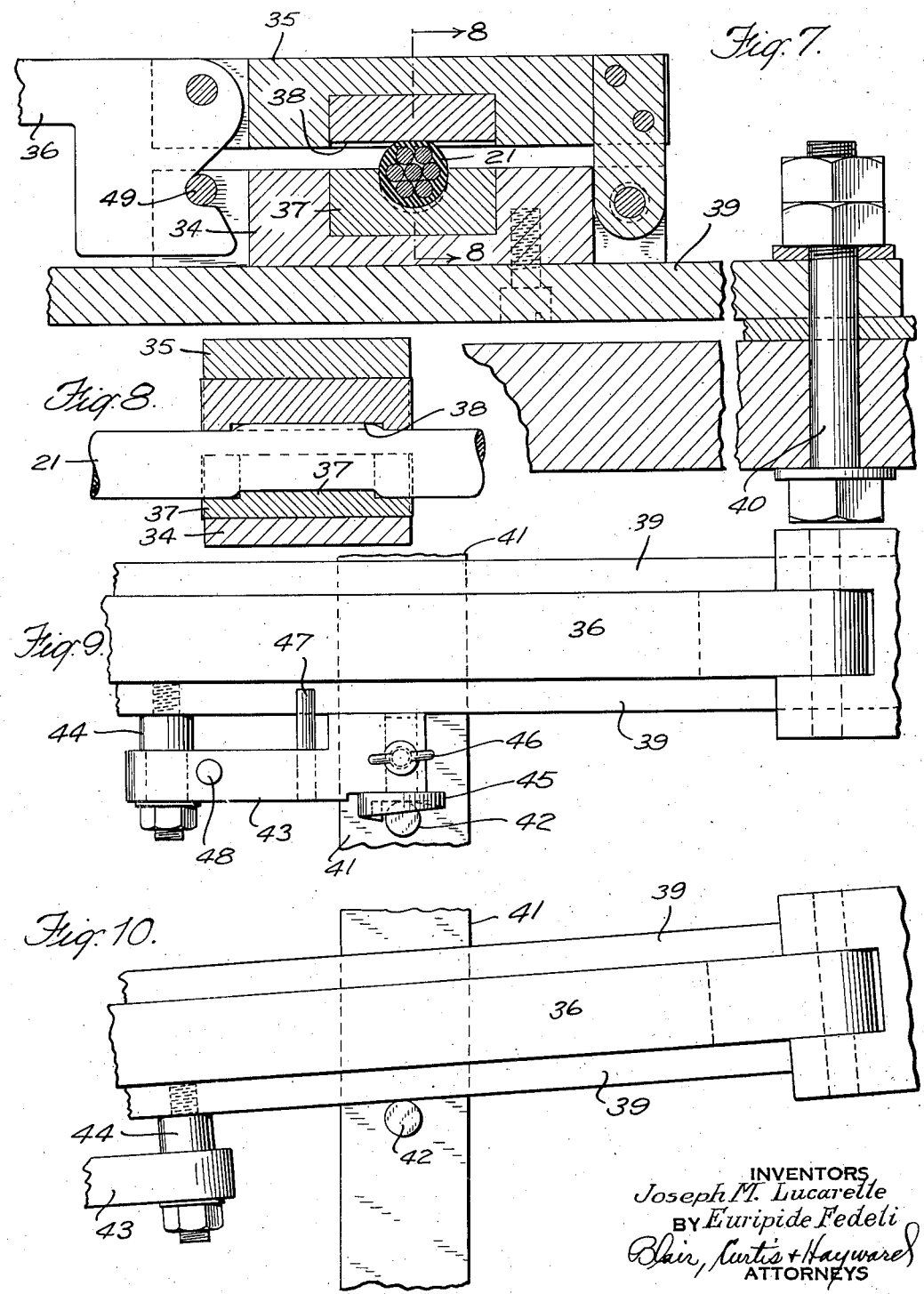

Patented Jan. 29, 1946

2,393,919

UNITED STATES PATENT OFFICE 2,393,919

CABLE STRIPPING DEVICE

Joseph M. Lucarelle and Euripide Fedeli, Bridgeport, Conn., assignors to Dictaphone Corporation, New York, N. Y., a corporation of New York Application May 11, 1943, Serial No. 486,502

9 Claims. (Cl. 81—9.51)

The present invention relates to an improvement in cable stripping devices.

In preparing to attach or install insulated or armored cables comprising a core of one or more insulated conductors within a sheath, it is customary to remove end portions of the sheath to expose predetermined lengths of the conductors. Sheaths commonly employed in cable manufacture are made of fabric or rubber, or a combination thereof, with varying compositions and thicknesses for different contemplated uses. An essential consideration in cable stripping is that the end sections of sheath be removed without injury to the conductors or their protective coverings, as by cutting or abrasion thereof.

An object of the present invention has been to provide cable stripping apparatus of simple and durable construction and which, in use, permits expeditious and controlled cutting of a sheath of any usual composition or thickness and removal of an end portion thereof without injury to the underlying conductors or wires. A further object has been to provide a cable stripper wherein the sheath is cut by one instrumentality and the incision so made is engaged by another in effecting removal of the end section of sheath, thereby avoiding undue strain on the cutter and providing more effective separation of said cut off end portion.

Figure 3:
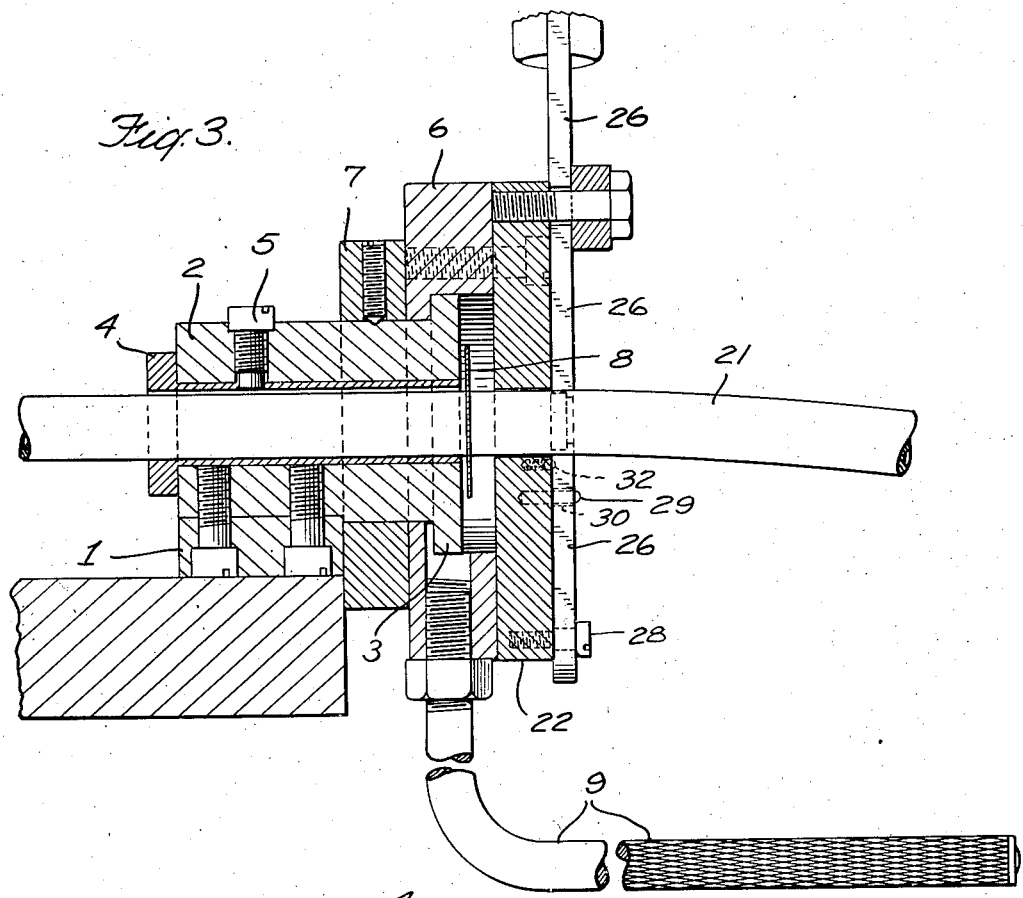
Figure 4:
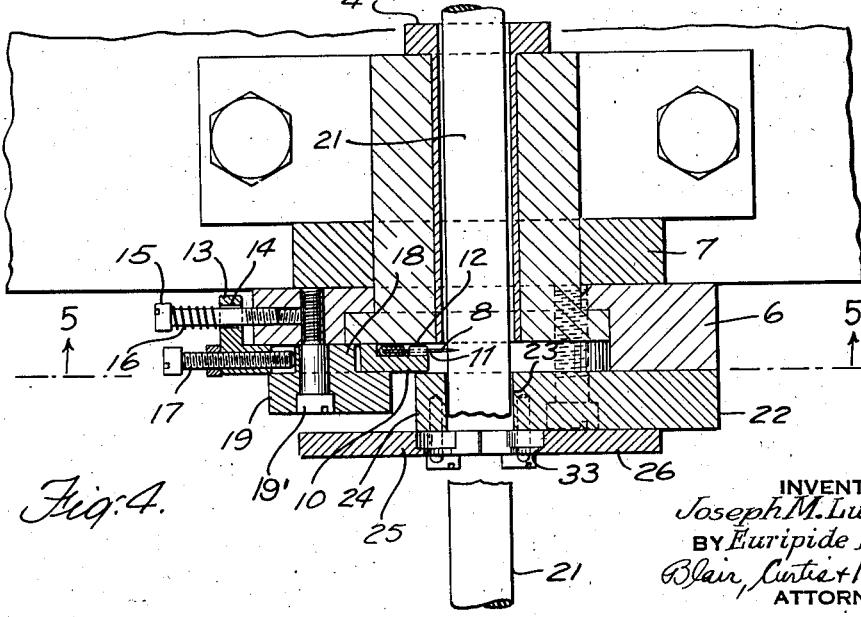

Other objects and advantages in construction and use will appear from the following description of a preferred embodiment together with the appended drawings, wherein:

Figure 1 is a plan view;

Figure 2, an enlarged end view from the line 2—2 of Figure 1;

Figure 3, a longitudinal vertical section on the line 3—3 of Figure 2;

Figure 4, a horizontal section on the line 4—4 of Figure 2;

Figure 5, a view partly in transverse vertical section on the line 5—5 of Figure 4;

Figure 6, a transverse vertical section on the line 6—6 of Figure 1;

Figure 7, an enlarged transverse vertical section on the line 7—7 of Figure 1;

Figure 8, an enlarged fragmentary view in section on the line 8—8 of Figures 1 and 7;

Figure 9, an enlarged fragmentary plan view of a portion of the operating arm and clamping and differential spacing or stop devices associated therewith showing the relative positions of the parts when the cable sheath is cut;

Figure 10, a similar view of the parts shown in Figure 9 but with the spacer finger deflected from spacing position; and Figure 11, a fragmentary view in section illustrating engagement of the stripper flange with an annular incision in a cable sheath.

As seen in Figure 1, one form of cable stripping apparatus according to our invention and suitable for hand operation is mounted on a work bench, for example, with the sheath cutting and stripping unit at one end and the cable clamping and moving devices conveniently adjacent thereto.

A typical stripping operation involves the steps of cutting an annular incision through or nearly through the cable sheath at a predetermined distance from the end to be stripped. The cable is then moved lengthwise to bring said incision into position to be engaged by suitable stripping means. While the severed end portion of the sheath is thus engaged and another portion of the cable is firmly clamped to an operating lever, the operator swings said lever in a direction to pull the cable away from the stripper and thus dislodge and separate the severed end portion of the sheath from its underlying core.

The sheath cutting and stripping unit, as shown in Figure 3, for example, includes a bracket 1 to which is secured a cable guiding and cutter supporting member including a sleeve 2 having a central opening and a terminal annular flange 3. The central opening receives a removable bushing 4 which is interchangeable with others having bores of different diameters so that cables of correspondingly different diameters may be received and held in proper operative relation to the cutting and stripping devices. A set screw 5 releasably secures the bushing 4 in operative position.

A rotatable cutter head 6 is mounted at the flanged end of the supporting sleeve 2 and concentrically with the bore of bushing 4 therein, where it is held in position by a collar 7. Said head 6 has a central recess in its outer face to accommodate the flange 3 and a sheath cutter 8 and is rotated manually by means of a crank handle 9 extending from its periphery.

The cutter 8, Figure 5, is secured at the inner end of a carrier in the form of a frame or slide 10. Where the cutter is a conventional single edge safety razor blade 8, as shown, an inner end portion of the slide 10 is cut away, Figure 4; and the blade 8 is disposed in the recess thus formed. Blade 8 is assembled with the slide 10 and secured thereto by screws engaging notches provided at opposite side edges of said blade.

Where said blade has an intermediate perforation, as 11, Figure 5, the slide is provided with a lug 12 which engages said perforation.

Slide 10 has tapered edges which slidably engage the opposed undercut portions of a groove in the annular flange or rim portion of head 6. As seen in Figure 4, slide 10 has an end extension 13 overlying peripheral portions of head 6 adjacent to the outer end opening of said slide groove. Said extension 13 has openings 14 through which headed bolts 15 are passed and secured in head 6 to retain compression springs 16 in operative position between said extension 13 and said bolt heads. Slide 10 and cutter 8 thereon are thus normally biased inwardly or toward cutting position by said springs 16.

The slide 10 is also provided with a cutter position adjusting screw 17 threaded into the left-hand end of slide 10, as seen in Figure 5, and extending through the outer portion of said slide so as to project into a rectangular opening 10' formed within said slide. Screw 17 is radially mounted with respect to the axis of said cutter head 6 to permit radial adjustment of said slide 10 toward and away from said axis. A cam plate 19 is pivotally mounted upon a shoulder screw 19', which extends outwardly from the outer face of head 6 so as to intersect at right angles the extended axis of the adjustment screw 17. This cam plate is provided with an eccentric cam portion 18 positioned within the opening 10' of said slide 10 in such relation to the screw 17 that the latter serves as a cam follower for the purpose of effecting reciprocatory movement of said slide in said head 6. The inner end of screw 17 is held resiliently against the periphery of cam 18 by the springs 16, and the cam may be manually adjusted about its axis by means of a lever or operating handle 20. By adjusting the position of said screw endwise the inner position of the slide in the groove and therefore the cutting position of blade 8 can be accurately and readily set to accommodate any usual sheath thickness.

When lever 20 is rocked from the down position, Figure 2, to the up position, Figure 5, for example, eccentric cam 18 is rotated in a manner to permit movement of slide 10 and blade 8 inwardly from retracted position to sheath cutting position where they are yieldingly held by pressure of the springs 16. Head 6 may then be rotated manually 360° by means of handle 9 to cause blade 8 to produce an annular incision in a predetermined portion of the sheath or outer covering of a cable 21.

Inasmuch as the thickness of the sheath or outer cover of different cables of approximately the same diameter may vary, it is desirable to accurately control the depth of incision for any given run or type of cable so that the cutter will not injure the insulation of the conductor wires. This control is adequately provided by the above described slide and cutter adjusting and actuating devices. By rocking lever 20 back from its position as shown in Figure 5, blade 8 is withdrawn from cutting position, Figure 5, and returned to retracted position, Figure 2, after the annular incision has been made in the cable sheath and therefore is not involved in the subsequent stripping step.

As shown in Figures 3 and 4, an end plate 22 is secured to head 6. Said plate has a guide hole 23 of approximately the same diameter as and coaxial with the bore of bushing 4. Thus, when head 6 is rotated in cutting, the cable end is supported in guides at both sides of the cutting plane.

In the embodiment shown in the drawings, end plate 22 covers only a portion of the front area of head 6. This leaves space opposite the straight edge 24 thereof to receive and actuate the cam plate 19 and lever 20.

End plate 22 also supports cooperating stripper plates 25 and 26, end portions of which are pivotally secured thereto at 27 and 28 respectively. Pins 29 extending outwardly from end plate 22 engage slots 30 in said stripper plates to limit angular movement thereof away from stripping position. Mid portions of said stripper plates are engaged and held in position on said end piece 22 by a retaining and guide plate 31.

Friction detents 32 mounted in recesses in head 6 engage shallow notches in the under surface of said stripper plates to releasably retain the latter in closed or stripping position during the stripping operation to be described.

Opposed inner edge or face portions of said stripping plates 25 and 26 are cut away to form semi-circular notches, the edges of which are reduced to provide a narrow annular flange 33, Figure 4, when said face portions are brought together. Said flange 33 is narrow enough to enter an annular incision previously made by the cutter 8—but is preferably not adapted to effect any cutting in addition thereto.

Flange 33 is also of a depth sufficient to extend into said incision without, however, tightly gripping the cable core. The latter may therefore readily be drawn by suitable means through the opening defined by said annular flange 33 while the severed sheath is held against such movement and is consequently stripped from the core end.

As shown in Figures 1, 6, 7 and 8, a portion of cable 21 may be secured in a clamp comprising a lower jaw 34, an upper jaw 35 and a locking lever 36 pivoted to said upper jaw and having an end cam which engages and rides on a cross piece 49 when the locking lever is moved to locking position. The cable engaging part of lower jaw 34 has a raised portion 37, Figure 8, and upper jaw 35 has a recess 38 opposite said raised portion 37.

When said jaws are locked together, they produce a slight deformation of the cable sheath section engaged between said parts 37 and 38 and thus prevent endwise slipping when the clamp is actuated to move said cable in the stripping step.

Said lower clamp jaw 34 is secured on an operating arm 39 which is pivoted on a bolt 40, Figure 7, at its inner end. Intermediate portions of arm 39 slidably engage a rail plate 41 secured to the work bench. A stop lug 42 extends upwards from the top face of rail plate 41 and between said operating arm and the previously described cutting and stripping unit at the adjacent end of the bench.

As shown in Figures 9 and 10, arm 39 carries a spacing finger 43 pivoted on a stud 44 and with a free end portion interposed between the adjacent face of said arm and the stop lug 42, said finger being provided with an operating handle 48. Said free end of finger 43 supports a rotatably adjustable spacing piece 45 presenting a helical contact face adapted to engage the stop 42 when the parts are in the relative positions shown in Figure 9. By adjusting said spacing piece to bring one portion or another of said helical face into stop engaging position, the effective thickness of the spacing member may be accurately varied within practical working limits. A set screw 46 secures said spacing piece 45 in any desired position of adjustment in relation to finger 43. A stop pin 47 extending from finger 43 is positioned to rest on one portion of the upper surface of arm 39 to support said finger 43 and spacing piece 45 in operative spacing position when disposed as in Figure 9, and bears on another portion of said upper surface of arm 39 to support the free end of finger 43 and spacing piece 45 out of operative position when the parts are disposed as indicated in Figure 10.

In utilizing the cable stripping apparatus hereinabove described, that end of a length of cable from which an end portion of the sheath is to be removed is inserted through the bore of bushing 4 and through and beyond the hole 23 in end plate 22 to a predetermined extent in relation to blade 8. Thus, if the length of sheath to be removed is five inches, the end face of the cable will be extended to a point five inches from the plane of said blade. The cable is secured in this position by swinging lever 36 and top clamping jaw 35 down to the locking position shown in full line, Figure 6, as previously described, at which time the finger 43 also occupies the spacing position shown in full line in said figure and in Figure 9.

The cutter operating lever arm 20, Figure 2, is swung clockwise to release blade 8 into the cutting position shown in Figure 5. Head 6 with the cutter and other attached parts is rotated one turn by handle 9 which produces an annular incision of the required depth in the sheath of cable 21. Later separation of the severed projecting end of the sheath is facilitated by giving it a slight twist by hand to thus more completely detach the cut section from the remainder of the sheath.

Operating lever 20 and connected parts are now returned to their initial positions to retract blade 8 from its cutting position and thus to disengage cable 21.

Handle 48 is now moved to swing the spacing finger 43 upwardly from full line position, Figures 6 and 9, to the position shown in Figure 10, and in dotted lines, Figure 6. This displaces the spacing piece 45 in relation to stop 42 so that operating arm 39 may now be moved from its cutting position, Figure 9, to its stripping position, Figure 10, where it is stopped by lug 42. Said movement advances the incision made by cutter 8 into position to be engaged by the reduced annular edge 33 of the stripper plates 25, 26 when these are moved to bring their opposed faces together, Figure 11.

To effect stripping, the outer end of operating arm 39 is actuated to swing in the direction of the arrow, Figure 1. In so doing, cable 21 clamped thereto is drawn away from the stripper plates 25, 26 until the short end section of the sheath intercepted by the annular stripping flange 33 is completely separated from the remainder of the cable. The stripper plates 25, 26 are thereafter moved apart to condition the device to receive the next cable length; and the stripped cable is disengaged from the clamp.

The procedural steps above set forth can be performed rapidly and efficiently by one or two operators. Proper use of the described apparatus insures uniform and effective cable stripping with minimum likelihood of damage to the conductors. Favorable results in use are enhanced by the described features of adjustment whereby regulation of the depth of incision is controllable to any desired degree of accuracy, and whereby the extent of endwise movement of the cable from cutting to stripping position may be accurately adjusted to compensate for changes in the spacing between the cutter and the stripping flange.

As various embodiments may be made of the above invention and as changes might be made in the embodiment above set forth, it is to be understood that all matter hereinbefore set forth or shown in the accompanying drawings is to be interpreted as illustrative and not in a limiting sense.

We claim:

1. Cable stripping apparatus comprising a rotatable head, a cutter mounted thereon and adjustable toward and from a position to cut an annular incision in the sheath of a length of cable, guide means adapted and positioned to hold a length of cable with an end portion extending across the path of rotation of said cutter, sheath stripping means spaced from said cutter and normally disengaged from said cable, means for moving said stripping means into operative sheath stripping engagement with the cable, means for clamping the cable, and means for moving the clamping means and the cable away from the sheath stripping means.

2. Cable stripping apparatus comprising a rotatable sheath cutter, sheath stripping means spaced from the plane of rotation of said cutter, an operating arm movable toward and from said cutter, a cable clamp mounted thereon, a stop arranged in the path of movement of said arm, and a spacing member mounted on said arm and movable into and out of position between said arm and said stop.

3. Cable stripping apparatus comprising a rotatable sheath cutter, sheath stripping means spaced from the plane of rotation of said cutter, an operating arm movable toward and from said cutter, a cable clamp mounted thereon, stop means arranged in the path of movement of said arm, and means cooperating with said arm and said stop to vary the stop position of said arm in relation to said cutter.

4. Cable stripping apparatus comprising a rotatable head, a cutter mounted thereon adapted to cut an annular incision in the sheath of a cable extending coaxially through said head, sheath stripping means spaced a predetermined distance from the plane of rotation of said cutter and cable gripping means positioned on the opposite side of said cutter from said stripping means and movable said predetermined distance toward said cutter and stripping means adapted to grip the cable and move same longitudinally after the sheath cutting operation said predetermined distance toward said stripping means.

5. Cable stripping apparatus comprising a rotatable head, a cutter mounted thereon adapted to cut an annular incision in the sheath of a cable extending coaxially through said head, sheath stripping means spaced a predetermined distance from the plane of rotation of said cutter, and cable gripping means mounted for reversible movement to move the cable in one longitudinal direction said predetermined distance toward said stripping means, and in the opposite direction a sufficient distance to effect removal of the detached length of sheath.

6. Cable stripping apparatus comprising a rotatable head, a cutter mounted thereon adapted to cut an annular incision in the sheath of a cable extending coaxially through said head, sheath stripping means spaced a predetermined distance from the plane of rotation of said cutter, and means for gripping the cable and moving same longitudinally after the sheath cutting operation said predetermined distance toward said stripping means, said stripping means comprising a pair of members movable transversely to open and closed positions with respect to said cable and having respectively notched portions adapted to penetrate said incision when in closed position.

7. Cable stripping apparatus comprising a rigid guide member and a relatively rotatable guide member for receiving spaced portions of a length of cable, a cutter head movable with said rotatable guide member about the axis of said cable, a cutter carrier movably mounted on said cutter head for radial movement with respect to said axis, a sheath cutter mounted on said carrier between said guides, means for moving said carrier in relation to said head to effect movement of said cutter into and out of cutting position comprising a cam mounted on said rotatable head for rotative movement about an axis parallel to said cable axis within a recessed portion of said rotatable head, and adjustable cam following means on said cutter carrier comprising a member disposed upon the opposite side of said cam from said axis and adjustable with respect to said carrier toward and away from said axis to limit radial movement of said carrier toward said axis.

8. In cable stripping apparatus, in combination, a cutter head mounted to rotate about a rigidly supported length of cable, a cutter carrier mounted in guides on said head to slide radially into and out of cutting position, resilient means biasing said carrier toward cutting position, a cam mounted on said head to rotate about an axis parallel to the axis of rotation of said head and in operative relation to said carrier normally to retain said carrier out of cutting position, and means for turning said cam about its axis to release said carrier for advance to cutting position.

9. In cable stripping apparatus, in combination, a cutter head mounted to rotate about a rigidly supported length of cable, a cutter carrier mounted in guides on said head to slide radially into and out of cutting position, resilient means biasing said carrier toward cutting position, a cam rotatably mounted on said head in operative relation to said carrier normally to retain said carrier out of cutting position, means for moving said cam to release said carrier for advance to cutting position, and adjustable means carried by said carrier for operative engagement with said cam.

JOSEPH M. LUCARELLE.
EURIPIDE FEDELI.